United States Patent [19]
Abthoff et al.

[11] Patent Number: 5,256,103
[45] Date of Patent: Oct. 26, 1993

[54] VENTILATION ARRANGEMENT FOR THE INTERIOR OF A VEHICLE, IN PARTICULAR A HEATING AND/OR AIR-CONDITIONING UNIT FOR A MOTOR VEHICLE

[75] Inventors: Jörg Abthoff, Plüdershausen; Hans-Dieter Schuster, Schorndorf; Friedhelm Nunnemann, Winnenden; Peter Bach, Stuttgart; Michael Osswald, Ludwigsburg, all of Fed. Rep. of Germany

[73] Assignee: Mercedes-Benz AG, Fed. Rep. of Germany

[21] Appl. No.: 838,859

[22] Filed: Feb. 21, 1992

[30] Foreign Application Priority Data

Feb. 23, 1991 [DE] Fed. Rep. of Germany ....... 4105724

[51] Int. Cl.$^5$ ................................................ B60H 3/06
[52] U.S. Cl. ...................................... 454/139; 55/524; 454/158
[58] Field of Search ............... 454/75, 139, 148, 158

[56] References Cited

U.S. PATENT DOCUMENTS

| | | | |
|---|---|---|---|
| 3,870,495 | 3/1975 | Dixson et al. | 454/158 X |
| 4,007,875 | 2/1977 | Frolz et al. | 454/158 X |
| 4,551,304 | 11/1985 | Hölzer et al. | 454/158 X |
| 4,610,703 | 9/1986 | Kowalczyk | 454/158 X |
| 4,981,501 | 1/1991 | Von Blücher et al. | 55/316 |
| 5,004,487 | 4/1991 | Kowalczyk . | |

FOREIGN PATENT DOCUMENTS

| | | |
|---|---|---|
| 0214605 | 9/1986 | European Pat. Off. . |
| 0370222 | 10/1989 | European Pat. Off. . |
| 3004675 | 8/1981 | Fed. Rep. of Germany . |
| 3526407 | 2/1986 | Fed. Rep. of Germany . |
| 3526462 | 1/1987 | Fed. Rep. of Germany . |
| 3719418 | 7/1988 | Fed. Rep. of Germany . |
| 3706220 | 9/1988 | Fed. Rep. of Germany ...... 454/158 |
| 3516113 | 11/1988 | Fed. Rep. of Germany . |
| 3819002 | 12/1989 | Fed. Rep. of Germany . |
| 3912013 | 10/1990 | Fed. Rep. of Germany . |
| 237214 | 9/1989 | Japan ................................. 454/158 |

*Primary Examiner*—Harold Joyce
*Attorney, Agent, or Firm*—Evenson, McKeown, Edwards & Lenahan

[57] ABSTRACT

A ventilation arrangement for the interior of a motor vehicle, having at least a heating or air-conditioning unit. The ventilation arrangement has a fan for air exchange in the interior and a filter for the adsorption of odorous and/or harmful substances contained in the air stream. The filter is designed so that, for the widest possible spectrum of odorous and/or harmful substances, a filter effect is produced which is based on rapid adsorption of the odorous and harmful substances and a gradual desorption thereof with a long time delay. A high short-term concentration of the odorous and/or harmful substances is thus converted by the filter into an extremely low but, instead, long-lasting emission which, with sufficiently extensive dilution, remains below a preset odor threshold or nuisance threshold.

7 Claims, 2 Drawing Sheets

… … 5,256,103 …

VENTILATION ARRANGEMENT FOR THE INTERIOR OF A VEHICLE, IN PARTICULAR A HEATING AND/OR AIR-CONDITIONING UNIT FOR A MOTOR VEHICLE

BACKGROUND AND SUMMARY OF THE INVENTION

The present invention relates to a ventilation arrangement for the interior of a vehicle having heating and air conditioning units, a fan for air exchange of the vehicle interior, and a filter for adsorption of odorous or harmful substances. A known ventilation arrangement of this generic type is disclosed in German patent document DE-OS 30 04 675. In that device, a fan is provided for regenerating a chemisorption and catalyst filter and/or a drying layer of the filter, which fan runs in both directions of rotation and, in the regeneration phase, delivers secondary air via an additional secondary air flap and a heating device through the drying layer to the outside. Despite the additional means provided for regeneration, however, upon sudden concentration of odorous and/or harmful substances in the air surrounding the vehicle it is impossible with this device to prevent the concentration of these substances in the interior exceeding the odor threshold or nuisance threshold.

Another known ventilation arrangement of the above type is described in German patent document DE-OS 35 26 407, in which the air stream delivered by the fan is passed over the filter for a preset period only after an arbitrarily given switch-on command, in order to increase the service life of a chemically active absorption filter. Even with this measure, however, the above mentioned disadvantage of the previously described known arrangement cannot be avoided.

To increase the service life of filters in ventilation arrangement of the type described at the outset, German patent document DE-PS 37 06 220 discloses an arrangement in which the filter is pivoted out of its operating position to regenerate and flush it (in the pivoted-out position) in the reverse direction, with a part stream branched off from the air stream. In this design, the desired goal is attained only at an increased mechanical cost.

The state of the art also includes measures for providing a dust filter upstream of the odor filter in heating and/or air-conditioning units of motor vehicles (European Patent A2 0,214,605), and for embedding chemisorption masses into a dust filter (German patent document DE-OS 35 16 113). In addition, arrangements of the type described at the outset are known (German patent document DE-OS 35 26 462), in which the fresh air supply passing via the filter is stopped when a sensor arrangement detects an increased harmful substance content in the external air, and the harmful substance content in the interior of the vehicle is not greater than that in the external air. A compact design of an active charcoal filter is known from German patent document DE-OS 38 19 002.

The object of the present invention is to provide a ventilation arrangement and/or a heating or air-conditioning unit of the type described at the outset, in which an optimum filter action is obtained with the longest possible service life and the best possible ratio of absorption capacity to mass or size of the filter. This result should also be achievable by readily controllable fabrication methods.

This object is achieved by the ventilation arrangement according to the invention, in which an adsorption filter is provided having at least four plies of spherical active charcoal adsorbers deposited on a matrix carrier, with surface area, particle size distribution and micropore fraction in the carrier matrix parameters falling within the ranges set forth herein.

The advantage of such a filter resides to a great extent in its capacity to dilute odors and/or harmful substances; that is, the complete and rapid adsorption of these substances (and their gradual desorption, over a period of time thereafter). A high short-term concentration of the odorous and/or harmful substances is thus lowered to such an extent that the concentration in the interior remains below the odor and/or nuisance threshold of the components. At the same time, the filter is in many cases largely freed again of the adsorbed odorous and/or harmful substances, so that aging of the filter is retarded, and its service life is extended. A compact design of the adsorption filter with a favorable ratio of adsorption capacity to mass or size, with an optimum effect, is also achieved. the result is a more than proportional saving of weight, space requirement and costs. An initially complete adsorption of all relevant hydrocarbons independently of subsequent adsorption is achievable.

In another embodiment, the filter is associated with a controllable by-pass so that a part flow through the filter can be set in order to ensure high air throughputs where odorous and/or harmful substances are present only in small quantities (or not at all), and/or in order to allow a sufficiently slow desorption of the reversibly adsorbed substances.

The service life of the filter or of its protective action and performance capacity can be further increased if a prefilter is placed upstream of the filter so that even higher-boiling hydrocarbons (always present as background pollution) can be kept away from the main adsorption filter. Furthermore, the spherical active-charcoal adsorbers can advantageously be arranged on a folded carrier mat, which results in a low-resistance integration into an effective suspended-matter filter and a limited overall filter volume. The activity of the filter can be further boosted substantially by catalytic coating of the prefilter.

The necessary replacement of the prefilter after a period in operation, can be facilitated by separating the prefilter from the main filter, upstream of the fan. In this way, the prefilter can also be renewed without simultaneous replacement of the main filter, so that shorter change intervals of the prefilter are inexpensively possible.

In ventilation arrangements with a vaporizer for cooling the air, location of the main filter downstream of the vaporizer so that the air flowing into the main filter is cooled, and good filter action results especially for water-soluble odorous and/or harmful substances. In other cases, it can be advantageous to arrange the main filter upstream of the vaporizer, so that the fresh air stream is dried, which prevents the release of water stored in the main filter into the interior. For water-insoluble odorous and/or harmful substances, the installation of the main filter downstream of a heating element can be advantageous, because in this case a minimum relative humidity is present in the air at the main filter.

If a main filter is installed upstream of the vaporizer and a second main filter is installed downstream of the vaporizer, both the advantages described above can be obtained.

In a further embodiment of the invention, a circulating-air duct leading into the interior branches off from a fresh-air duct leading to the main filter, and a device for changing from a fresh-air mode to a circulating-air mode is provided. The device can respond when the concentration of odorous and/or harmful substances in the external air exceeds a predetermined value and/or when an increased concentration is present in the external air for a predetermined time. In every case, the prefilter and the main filter are additionally relieved, and their service life extended.

The content of odorous and/or harmful substances in the external air is advantageously determined according to the invention via a sensor arrangement which operates with a sensor in the interior of the vehicle and makes an appropriate selection between the fresh-air mode and the circulating-air mode. In this manner, both the performance of the filter system and the service life of the overall filter system can be increased. In fact, when the system has been changed over to the circulating-air mode, there is no filter loading.

The activity of the filter system designed according to the invention, or of the individual components of this system, is further increased if a circulating-air filter is provided in or at the end of the circulating-air duct, on the side of the interior. This filter may consist of a suspended matter filter part and an active-charcoal filter part. By means of such a filter combination, the coarse dusts transported into the interior by the passengers are absorbed and kept away from the main filter. In addition, the main filter is relieved of adsorbable substances which pass into the interior before change-over to the circulating-air mode or afterwards.

If the active charcoal part of the circulating-air filter is provided with a catalytic coating, the odorous and/or harmful substance fractions which have penetrated into the interior are slowly degraded in the circulating-air mode. In contrast to pure adsorption/desorption effects, however, this chemisorption effect leads to a filter consumption which limits the service life of the circulating-air filter.

Other objects, advantages and novel features of the present invention will become apparent from the following detailed description of the invention when considered in conjunction with the accompanying drawings.

DETAILED DESCRIPTION OF THE DRAWINGS

Figure 1:
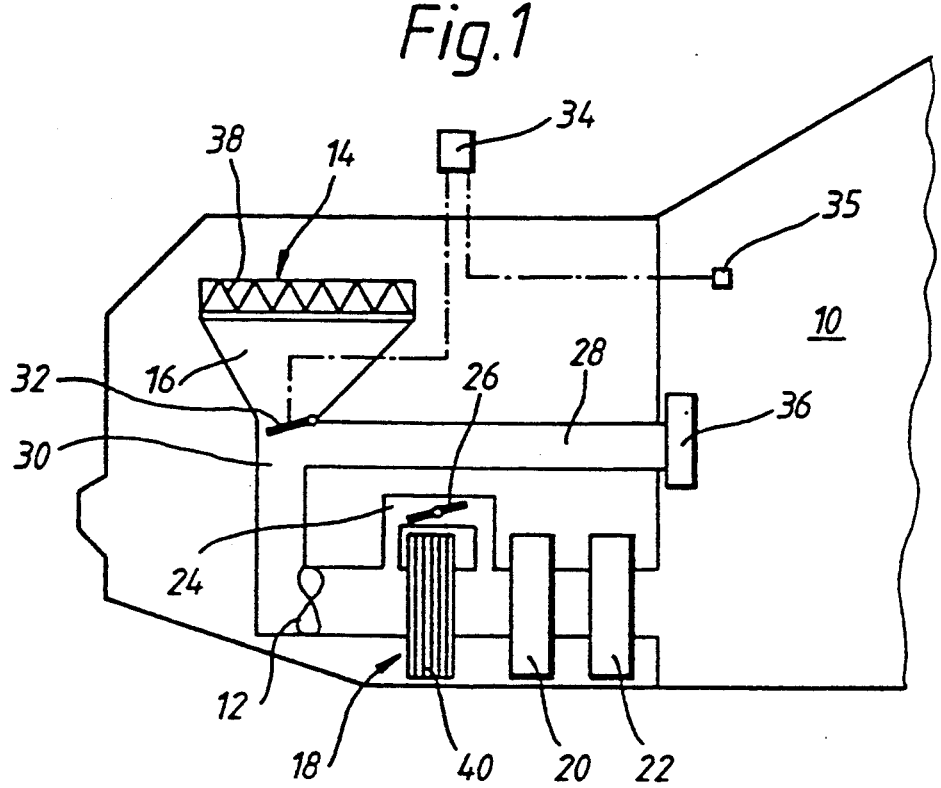
FIG. 1 is a schematic depiction of the essential functional units of a ventilation arrangement for a motor vehicle with a heating and air-conditioning unit, according to the invention.

The arrangement shown in Figure for the ventilation, heating and air-conditioning of the passenger compartment 10 of a motor vehicle has a fan 12, by means of which external air is delivered via a prefilter 14, a fresh-air duct 16, a main filter 18, a vaporizer 20 and a heating element 22 into the passenger compartment 10. The main filter 18 is associated with a by-pass 24 which is controlled by a by-pass flap 26. Control can be effected manually by the driver or by means of a sensor system which by itself establishes the need for a high air throughput.

From the passenger compartment 10, a circulating-air duct 28 leads to a point 30 which is located in the fresh-air duct 16 between the prefilter 14 and the fan 12. At the point 30, a change-over flap 32 for changing from the fresh-air mode to circulating-air mode is provided. The change-over flap 32 is controlled by a sensor system 34, which by itself establishes the need for the circulating-air mode in the event of high concentrations of odorous and/or harmful substances in the external air. The change-back to the fresh-air mode can also be influenced by an additional sensor 35 which detects the presence of odors or harmful substances in the passenger compartment. At the inlet of the circulating-air duct 28, a circulating-air filter 36 is provided, whose purpose and design are explained below.

The prefilter 14 consists of a combination of folded suspended-matter filter material 38 (Electret) and spherical active-charcoal adsorbers which are not shown in detail in the drawing. This filter combination is designed in such a way that the irreversibly or quasi-irreversibly adsorbable substances are precipitated in addition to dust particles and similar impurities, and the reversibly adsorbable substances are filtered out.

Figure 2:
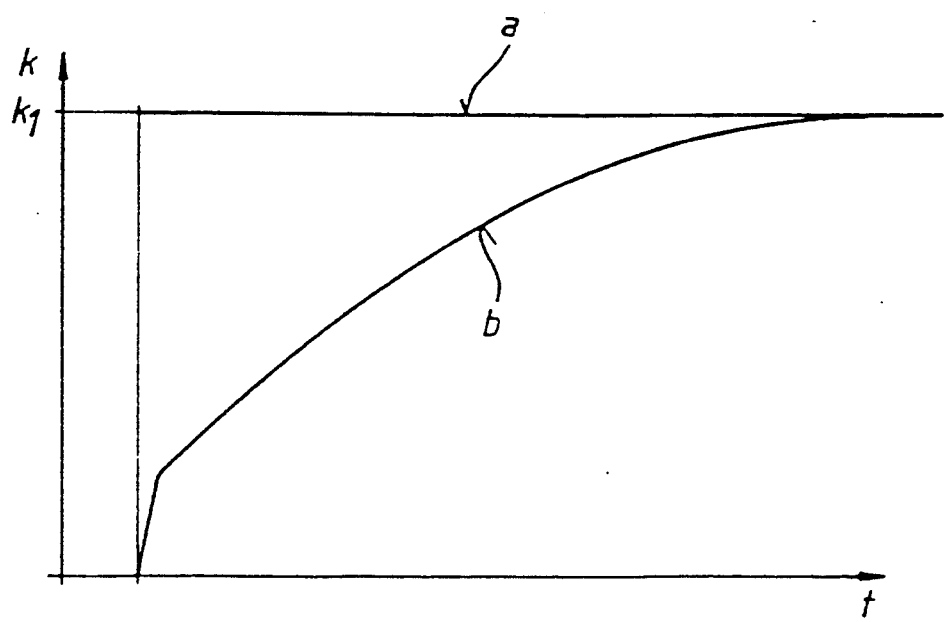
FIG. 2 shows a diagram of the adsorption capacity of the prefilter of the arrangement according to FIG. 1.

The diagram according to FIG. 2 shows the design and/or adsorption capacity of the prefilter 14. In this diagram, time t of a loading by odorous and/or harmful substances is plotted on the abscissa and the concentration k of these substances is plotted on the ordinate. If the odorous and/or harmful substance concentrations have the constant value $k_1$ over the entire period considered (line a), a concentration curve in accordance with the adsorption characteristic b of the prefilter 14 is established downstream of the prefilter 14. This shows a rapid rise and a shallow saturation curve (slow, long lasting adsorption).

The main filter 18 consists of multiple (preferably six) plies of matrix-fixed spherical active-charcoal adsorbers 40, and is designed to provide a rapid adsorption of the odorous and/or harmful substances and a gradual desorption thereof with a long time delay. The spherical active-charcoal adsorbers have the following characteristic data:

| Specific surface area: | >950 m²/g |
|---|---|
| Particle size distribution: | 0.6 ± 0.05 mm statistical mean, |
| | 0.3–084 mm > 85%, |
| | 0.5–0.7 mm > 80% |
| Micropore fraction in the carrier matrix: | Benzene adsorption > 35% by weight at 10% saturation and T = 20° C. |

Figure 3:
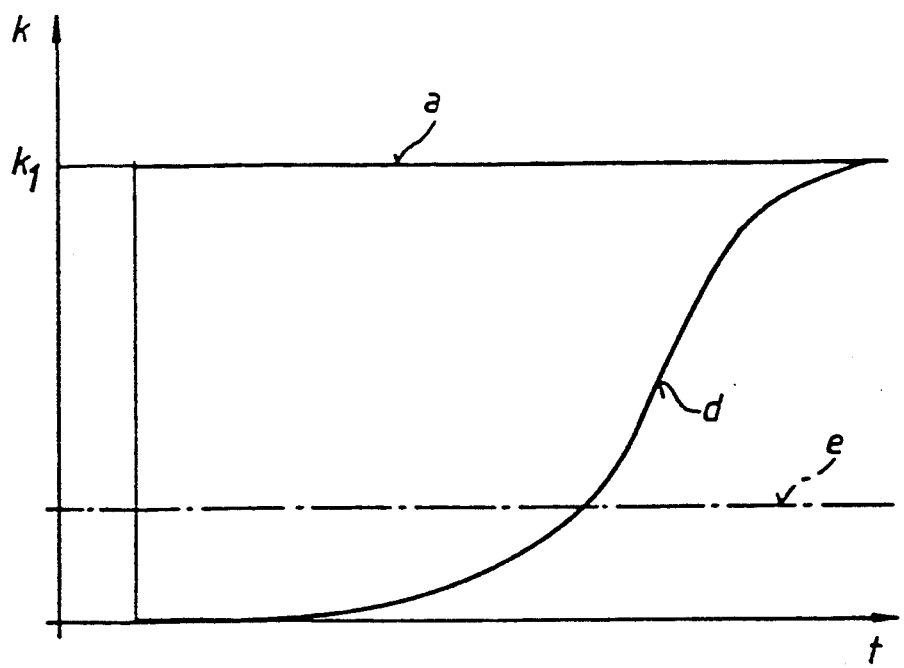
FIG. 3 shows a first diagram of the function of the main filter of the arrangement according to FIG. 1.
Figure 4:
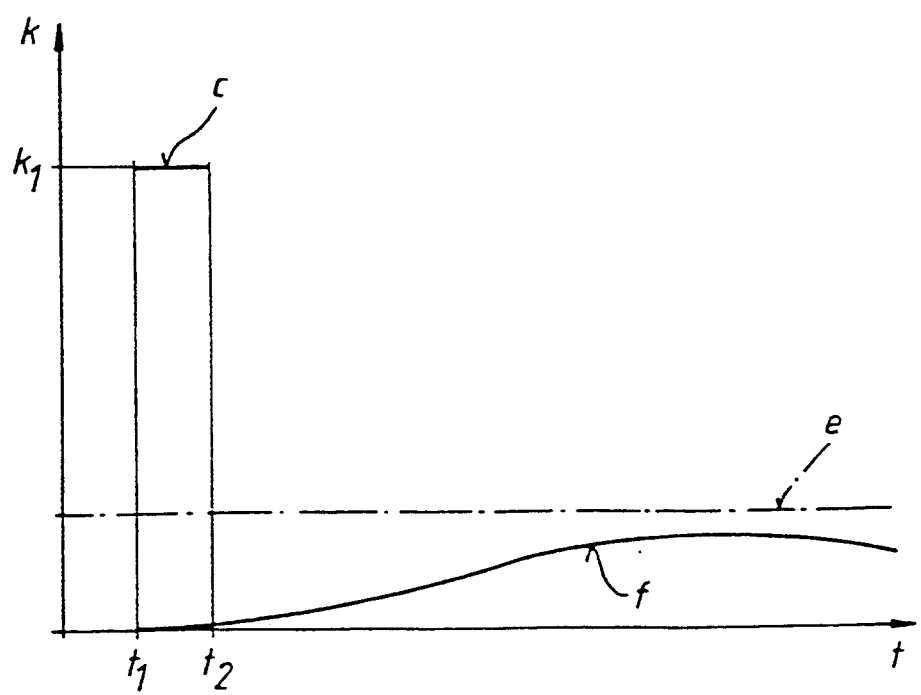
FIG. 4 shows a second diagram of the function of the main filter of the arrangement according to FIG. 1.

The diagrams according to FIG. 3 and 4 are characteristic of the design and adsorption behavior of the main filter 18. In both diagrams, the concentration of the odorous and/or harmful substances upstream (lines a and c) and downstream (lines d and f) of the main filter 18 is plotted against the time t, with long-term action being assumed in FIG. 3 (line a) and short-term action being assumed in FIG. 4 (line c). The adsorption characteristic d according to FIG. 3 has a low slope at the start, corresponding to a high retention capacity of the main filter 18. This property guarantees rapid adsorption of large quantities of odorous harmful substances appearing for a short time, so that the concentration downstream of the main filter 18 is reduced to below a preset nuisance threshold indicated by the dot-and-dash line e.

In interaction with the desired low desorption rate in the main filter 18, the result is that, if the action of a high concentration of odorous and/or harmful substances lasts only a short time, as assumed in FIG. 4 between the times t and tz, the concentration downstream of the main filter 18 does not rise above the nuisance threshold e. This effect is plainly visible in FIG. 4 from the shallow shape of the adsorption characteristic f of the main filter 18. The shape of the adsorption characteristic f can be flattened even further if, in the even of higher concentrations of odorous and/or harmful substances, the sensor system 34 changes over to the circulating-air mode at a suitable point in time, as described previously.

The circulating-air filter 36, associated with the circulating-air duct 28, has a suspended-matter filter part, and can be supplemented by an active-charcoal filter part which is preferably coated catalytically. The suspended-matter filter part filters off the coarse dusts transported by the passengers into the interior so that the main filter 18 is relieved in this respect even in the circulating-air mode, and its service life is extended. The active-charcoal filter part, preferably coated catalytically, slowly degrades the odorous and/or harmful substances which pass into the interior in the circulating-air mode, so that the main filter 18 is additionally relieved.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Ventilation arrangement for the interior of a vehicle comprising:
    at least one of a heating unit and an air-conditioning unit;
    a fan for air exchange in said interior;
    an adsorption filter for the adsorption of odorous and/or harmful substances contained in an air stream delivered by the fan;
    wherein said adsorption filter contains at least four plies of spherical active-charcoal adsorbers deposited on a carrier matrix,
    wherein the spherical absorbers and the carrier matrix have a specific surface area of greater than 950 m$^2$/g, a partial size distribution of 0.6+/−0.05 mm statistical means, more than 85% of the particles being begwen 0.3 mm and 0.85 mm, more than 80% of the particles being betwen 0.5 mm and 0.7 mm, an absorber deposit on the carrir matrix of about 1400 g/m$^2$, a characteristic valve of the carrier matrix of approximately 22 ppi, and a micropore fractin in the carrier matrix exhibiting Benzene absorption of greater than 35% by weight at 10% saturation at a temperature of 20° C.
    whereby, for the widest possible spectrum of odors and harmful substances, an initial adsorption nrate of said adsorption filter is so high and a desorption rate is so low that, on a sudden occurrence of an increased concentration of odorous and/or harmful substances in the air stream and during subsiding of increased concentration, a quantity of odorous or harmful substances passing with the air stream into the interior remains below a preset nuisance threshold.

2. Ventilation arrangement according to claim 1, wherine the adsorption filter has a controllable by-pass flap for permitting a stream of air to by-pass said filter, 3. Ventilation arrangement according to claim 1, wherine a prefilter is provided upstream of the adsorption filter in an air stream delivered by the fan, which prefilter copriss a combination of a suspended-matter filter material and special active-charcoal adsorbers for retaining both dust particles and irreversibly adsorbable substances, keeping said particles and substances away from the downstream adsorption filter.

4. Ventilation arrangement according to claim 3, wherein the prefilter is located at a point that is separated from the adsorption filter, upstream of the fan.

5. Ventilation arrangement according to claim 3, having a circulating-air duct which leads into said interior of said vehicle and branches off from a fresh-air duct leading to the adsorption filter, and flap means for changing over from a fresh-air mode to a circulating-air mode, wherein said flap means is controlled by a sensor arrangement which detects odorous and harmful substances in external air.

6. Ventilation arrangement according to claim 5, wherein a circulating-air filter is provided at the circulating-air duct and the circulating-air filter comprises a suspended-matter filter part and an active-charcoal filter part.

7. Ventilation arrangement according to claim 6, wherein the active charcoal filter part contains a catalytic coating.

* * * * *